(12) United States Patent
Kim

(10) Patent No.: US 9,828,905 B2
(45) Date of Patent: *Nov. 28, 2017

(54) COMBUSTION PRE-CHAMBER AND METHOD FOR OPERATING SAME

(71) Applicant: Caterpillar Inc., Peoria, IL (US)

(72) Inventor: Charlie Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 167 days.

This patent is subject to a terminal disclaimer.

(21) Appl. No.: 14/799,735

(22) Filed: Jul. 15, 2015

(65) Prior Publication Data
US 2016/0195007 A1    Jul. 7, 2016

Related U.S. Application Data

(63) Continuation-in-part of application No. 14/588,559, filed on Jan. 2, 2015, now Pat. No. 9,482,192.

(51) Int. Cl.
| | |
|---|---|
| *F02B 43/10* | (2006.01) |
| *F02B 19/12* | (2006.01) |
| *F02B 19/00* | (2006.01) |
| *F02M 26/05* | (2016.01) |
| *F02M 26/23* | (2016.01) |

(Continued)

(52) U.S. Cl.
CPC ............. *F02B 43/10* (2013.01); *F02B 19/12* (2013.01); *F02B 2019/002* (2013.01); *F02M 26/05* (2016.02); *F02M 26/23* (2016.02); *F02M 26/35* (2016.02); *F02P 13/00* (2013.01); *F02P 19/00* (2013.01); *Y02T 10/125* (2013.01); *Y02T 10/32* (2013.01)

(58) Field of Classification Search
CPC ...... F02M 25/14; F02M 35/104; F02B 43/10; F02B 2043/103; F02B 19/00; F02B 2019/002; F02B 2019/06; F02B 19/02; F02B 19/06; F02B 19/08; F02B 19/10; F02B 19/12; F02B 19/14; F02B 19/16
USPC ................................ 123/253, 254, 255, 256
See application file for complete search history.

(56) References Cited

U.S. PATENT DOCUMENTS

| | | | | |
|---|---|---|---|---|
| 3,958,538 A | * | 5/1976 | Hoshino | ................. F02B 43/10 123/1 A |
| 4,004,554 A | * | 1/1977 | Kosaka | .................. F02B 43/10 123/25 R |

(Continued)

FOREIGN PATENT DOCUMENTS

| | | |
|---|---|---|
| DE | 102005041483 A1 | 3/2007 |
| JP | 2003254063 A | 9/2003 |

*Primary Examiner* — Sizo Vilakazi

(57) ABSTRACT

An engine includes a main combustion chamber; an intake duct configured to provide a lean fuel-oxidizer mixture to the main combustion chamber; a pre-chamber in fluid communication with the main combustion chamber, the pre-chamber including an ignition energy source operatively coupled to the pre-chamber, and a heating element in thermal communication with the pre-chamber; and a controller operatively coupled to the ignition energy source and the heating element. The controller is configured to initiate combustion of the lean fuel-oxidizer mixture in the main combustion chamber by activating the ignition energy source, and heat fuel and oxidizer in the pre-chamber via the heating element to a temperature sufficient to produce hydrogen peroxide ($H_2O_2$) in the pre-chamber.

20 Claims, 8 Drawing Sheets

(51) Int. Cl.
  *F02M 26/35*    (2016.01)
  *F02P 13/00*    (2006.01)
  *F02P 19/00*    (2006.01)

(56) References Cited

U.S. PATENT DOCUMENTS

| | | | |
|---|---|---|---|
| 5,611,307 A * | 3/1997 | Watson | F02B 19/1014 |
| | | | 123/254 |
| 7,261,097 B2 | 8/2007 | Gong et al. | |
| 7,832,372 B2 | 11/2010 | Blank | |
| 8,365,689 B2 | 2/2013 | Gruber et al. | |
| 8,443,716 B2 | 5/2013 | Keller | |
| 8,567,369 B2 | 10/2013 | Johnson | |
| 2003/0116121 A1* | 6/2003 | Agama | F02B 1/12 |
| | | | 123/259 |
| 2013/0263820 A1 | 10/2013 | Yu et al. | |
| 2014/0144406 A1* | 5/2014 | Schock | F02B 19/12 |
| | | | 123/260 |
| 2014/0190437 A1* | 7/2014 | Chiera | F02B 9/10 |
| | | | 123/145 A |
| 2014/0209057 A1* | 7/2014 | Pouring | F02B 19/12 |
| | | | 123/257 |

* cited by examiner

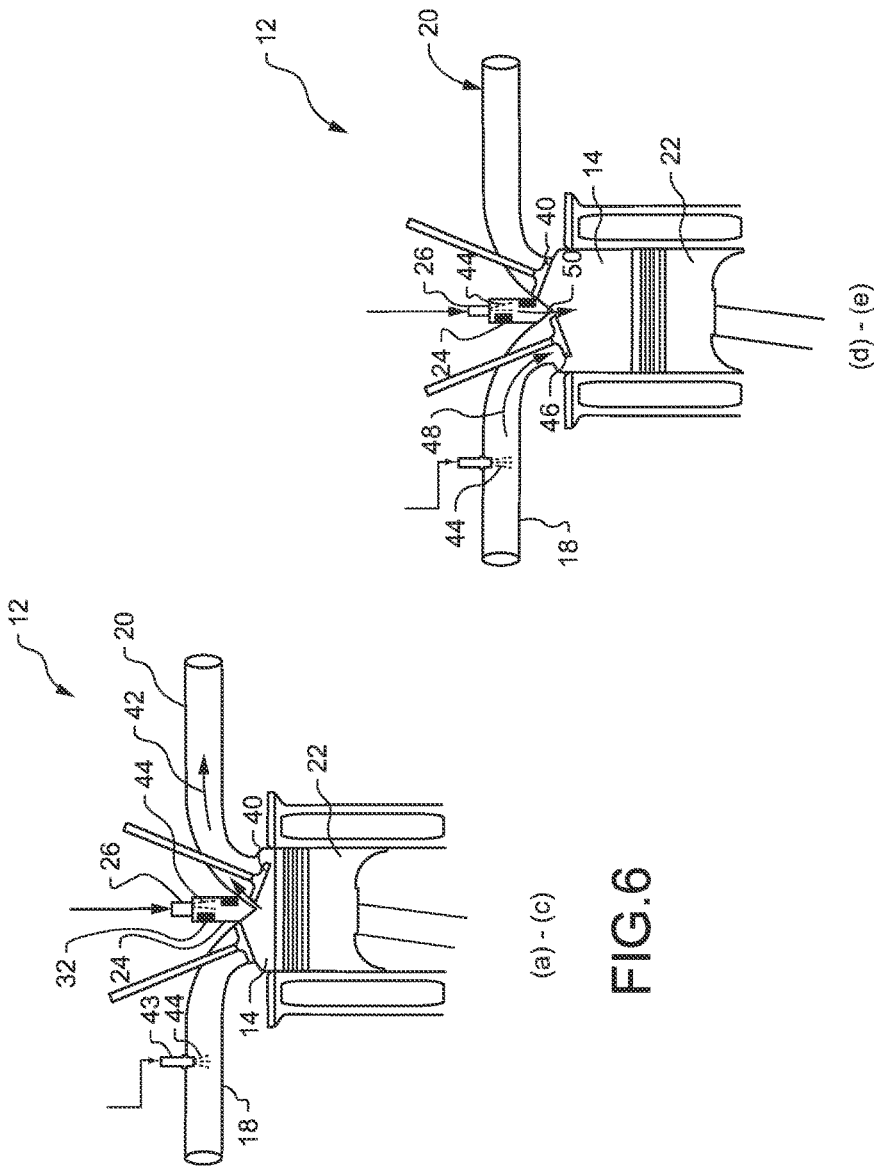

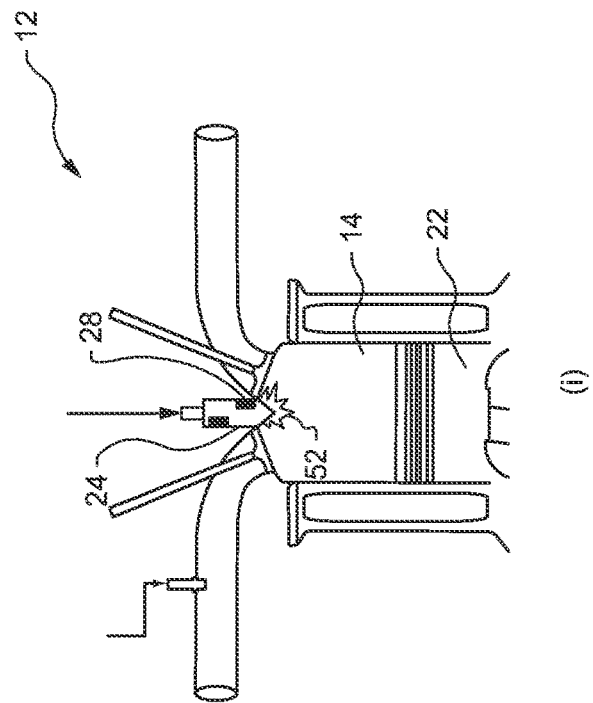
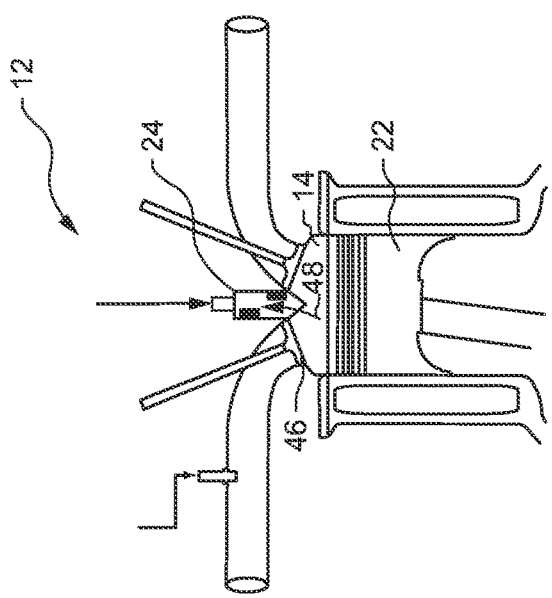

COMBUSTION PRE-CHAMBER AND METHOD FOR OPERATING SAME

CROSS-REFERENCE TO RELATED APPLICATIONS

The present application is a Continuation-in-Part of U.S. patent application Ser. No. 14/588,559, titled "Stable Combustion in Spark-Ignited Lean-Burn Engine," filed on Jan. 2, 2015, the disclosure of which being hereby incorporated by reference in its entirety.

TECHNICAL FIELD

The present disclosure generally relates to lean-burn engines and, more specifically, relates to systems and methods to achieve stable combustion in spark-ignited lean-burn engines.

BACKGROUND

Reciprocating internal combustion (IC) engines are known for converting chemical energy from a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy in the mixture into heat. In turn, expansion of the combustion products within the variable volume performs work on the piston, which may be transferred to an output shaft of the IC engine.

Some constituents in the exhaust stream from an IC engine, such as, for example, nitrogen oxides (NOx), unburned hydrocarbons (UHCs), and particulate matter (PM), may be subject to government regulations. Accordingly, operators may wish to control concentrations of regulated exhaust constituents released to the environment. The composition of exhaust discharged from an IC engine may be affected by control of the combustion process within the variable volume main combustion chamber, exhaust aftertreatment downstream of the main combustion chamber, or combinations thereof.

Some IC engines employ an externally-powered ignition source to initiate combustion of the fuel-oxidizer mixture within the variable volume. For example, an IC engine may include a spark plug defining a spark gap between an anode and a cathode, where the spark gap is in fluid communication with the variable volume and in electrical communication with an electric potential. Accordingly, applying the electric potential across the spark gap may cause an electric spark to arc across the spark gap, thereby initiating combustion of the fuel-oxidizer mixture within the variable volume.

Some reciprocating engines may operate under "lean-burn" conditions, such that an overall fuel/oxidizer ratio of a fuel-oxidizer mixture within the main combustion chambers is less than the stoichiometric ratio. Stated differently, a lean-burn engine may operate with an excess amount of air with respect to a stoichiometric mixture, such that complete combustion of the fuel-lean mixture would result in combustion products including unreacted oxidizer but no fuel.

As a way to accelerate combustion and improve the reliability of ignition, some lean-burn engines may include a pre-chamber to initiate combustion of fuel-oxidizer mixtures in the main combustion chamber (see e.g., U.S. Pat. No. 7,261,097). In particular, the pre-chamber may be a relatively small chamber in fluid communication with the main combustion chamber, in which a fuel-oxidizer mixture is ignited by a spark plug. The ignited fuel-oxidizer mixture in the pre-chamber produces a flame which may jet out into the main combustion chamber to ignite the lean fuel-oxidizer mixture in the main combustion chamber.

However, there is a need for improved systems and methods for enhancing combustion stability in lean-burn engines, especially for developing engines to operate at fuel-oxidizer mixtures that are leaner that those conventionally employed. The present disclosure addresses the aforementioned problems and/or other problems in the art.

It will be appreciated that this background description has been created to aid the reader, and is not to be taken as a concession that any of the indicated problems were themselves known in the art.

SUMMARY

According to an aspect of the disclosure, an engine comprises a main combustion chamber; an intake duct configured to provide a lean fuel-oxidizer mixture to the main combustion chamber; a pre-chamber in fluid communication with the main combustion chamber, the pre-chamber including an ignition energy source operatively coupled to the pre-chamber, and a heating element in thermal communication with the pre-chamber; and a controller operatively coupled to the ignition energy source and the heating element. The controller is configured to initiate combustion of the lean fuel-oxidizer mixture in the main combustion chamber by activating the ignition energy source, and to heat fuel and oxidizer in the pre-chamber via the heating element to a temperature sufficient to produce hydrogen peroxide (H2O2) in the pre-chamber.

According to another aspect of the disclosure, an engine comprises a main combustion chamber; an intake duct configured to provide a lean fuel-oxidizer mixture to the main combustion chamber; a pre-chamber in fluid communication with the main combustion chamber, the pre-chamber including an ignition energy source operatively coupled to the pre-chamber, and a heating element in thermal communication with the pre-chamber; and a controller operatively coupled to the ignition energy source and the heating element. The controller is configured to initiate a high temperature combustion of the lean fuel-oxidizer mixture in the main combustion chamber by activating the ignition energy source, and initiate a medium temperature combustion of fuel and oxidizer in the pre-chamber by adjusting a heat output from the heating element, the medium temperature combustion generating hydrogen peroxide ($H_2O_2$) in the pre-chamber, and the $H_2O_2$ being configured to disassociate into hydroxyl radicals (OH.) that stabilize combustion in both the pre-chamber and the main combustion chamber.

Another aspect of the disclosure provides a method for stabilizing combustion in a lean-burn engine. The lean-burn engine includes a main combustion chamber and a pre-chamber in fluid communication with the main combustion chamber, the pre-chamber having a spark igniter, and a heating element in thermal communication with the pre-chamber. The method comprises providing a mixture of fuel and oxidizer to the pre-chamber; producing hydrogen peroxide ($H_2O_2$) from the fuel and the air in the pre-chamber by transferring heat from the heating element to the mixture of fuel and oxidizer in the pre-chamber; providing a lean fuel-oxidizer mixture to the main combustion chamber; delivering the $H_2O_2$ produced in the pre-chamber to the main combustion chamber; igniting the lean fuel-oxidizer mixture in the main combustion chamber by activating the ignition energy source; producing hydroxyl radicals (OH.) from the $H_2O_2$ in the main combustion chamber in response to the igniting the lean fuel-oxidizer mixture in the main combustion chamber; and stabilizing combustion in the main combustion chamber with the OH. radicals.

These and other aspects and features of the present disclosure will be more readily understood when read in conjunction with the accompanying drawings.

BRIEF DESCRIPTION OF THE DRAWINGS

FIG. 6 is a schematic representation of a portion of a gas-exchange process of the piston cycle of FIG. 5, according to an aspect of the disclosure.

FIG. 7 is a schematic representation of a subsequent portion of the gas-exchange process, according to an aspect of the disclosure.

FIG. 8 is a schematic representation of a compression stage of the piston cycle, according to an aspect of the disclosure.

FIG. 9 is a schematic representation of a combustion stage of the piston cycle, according to an aspect of the disclosure.

It will be understood that the drawings are not necessarily drawn to scale and that the disclosed embodiments are sometimes illustrated schematically and in partial views. It will be further appreciated that the following detailed description is merely exemplary in nature and is not intended to limit the invention or the application and uses thereof. In this regard, it will be additionally appreciated that the described embodiments are not limited to use with a particular type of engine. Hence, although the present disclosure is, for convenience of explanation, depicted and described as certain illustrative embodiments, it will be appreciated that it can be implemented in various other types of embodiments and in various other systems and environments.

DETAILED DESCRIPTION

Aspects of the disclosure will now be described in detail with reference to the drawings, wherein like reference numbers refer to like elements throughout, unless specified otherwise.

Figure 1:
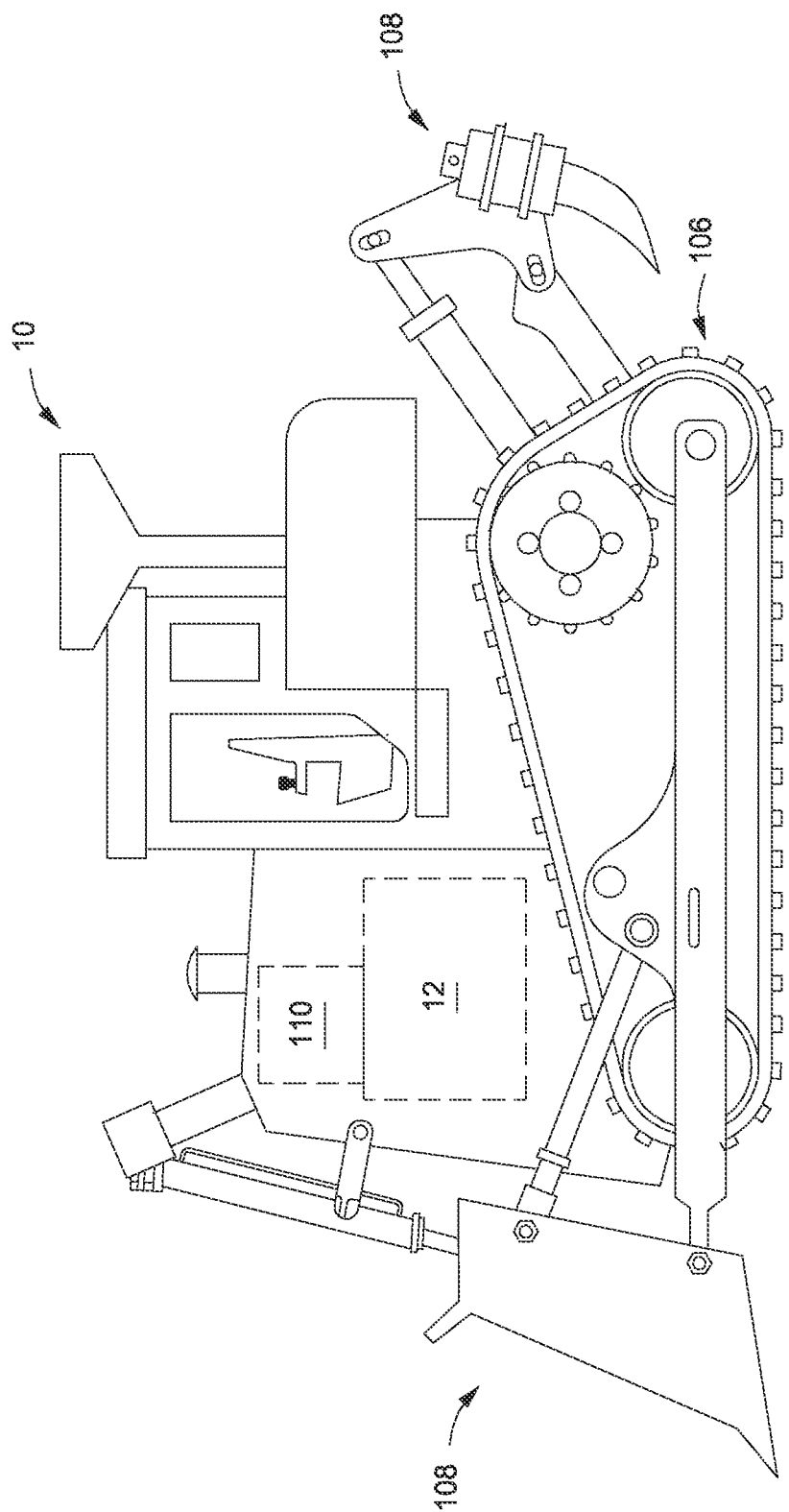
FIG. 1 is a schematic representation of a machine, according to an aspect of the disclosure.

FIG. 1 shows a schematic view of a machine 10, according to an aspect of the disclosure. The machine 10 includes an internal combustion (IC) engine 12 that is operatively coupled to a load. The machine 10 may also include a propulsion system 106, one or more work implements 108, or combinations thereof.

The IC engine 12 may be a reciprocating internal combustion engine, such as a compression ignition engine or a spark ignition engine, for example. The load may include an electric generator, a compressor, a pump, or combinations thereof. Alternatively or additionally, the load may include the propulsion system 106 or a work implement 108, such as a dump bed, a shovel, a drill, a fork lift, a feller buncher, a conveyor, a ripper, or any other implement known in the art for performing work on a load.

The machine 10 includes a controller 110 operatively coupled to the IC engine 12 for control thereof. It will be appreciated that the controller 110 may effect open-loop or closed-loop control actions based on inputs from operator input devices, sensors, operating maps stored therein, combinations thereof, or any other control inputs known in the art.

The machine 10 can be an "over-the-road" vehicle such as a truck used in transportation or may be any other type of machine that performs some type of operation associated with an industry such as mining, construction, farming, transportation, or any other industry known in the art. For example, the machine 10 may be an off-highway truck, an on-highway truck, a railway locomotive, a marine vessel, an earth-moving machine, such as a wheel loader, excavator, dump truck, backhoe, motor grader, material handler, or the like. The term "machine" can also refer to stationary equipment such as a generator that is driven by the IC engine 12 to generate electricity, a pump or compressor that is driven by the IC engine 12, or any other stationary drive equipment known in the art. The specific but non-limiting machine 10 illustrated in FIG. 1 is a track-type tractor or dozer.

Figure 2:
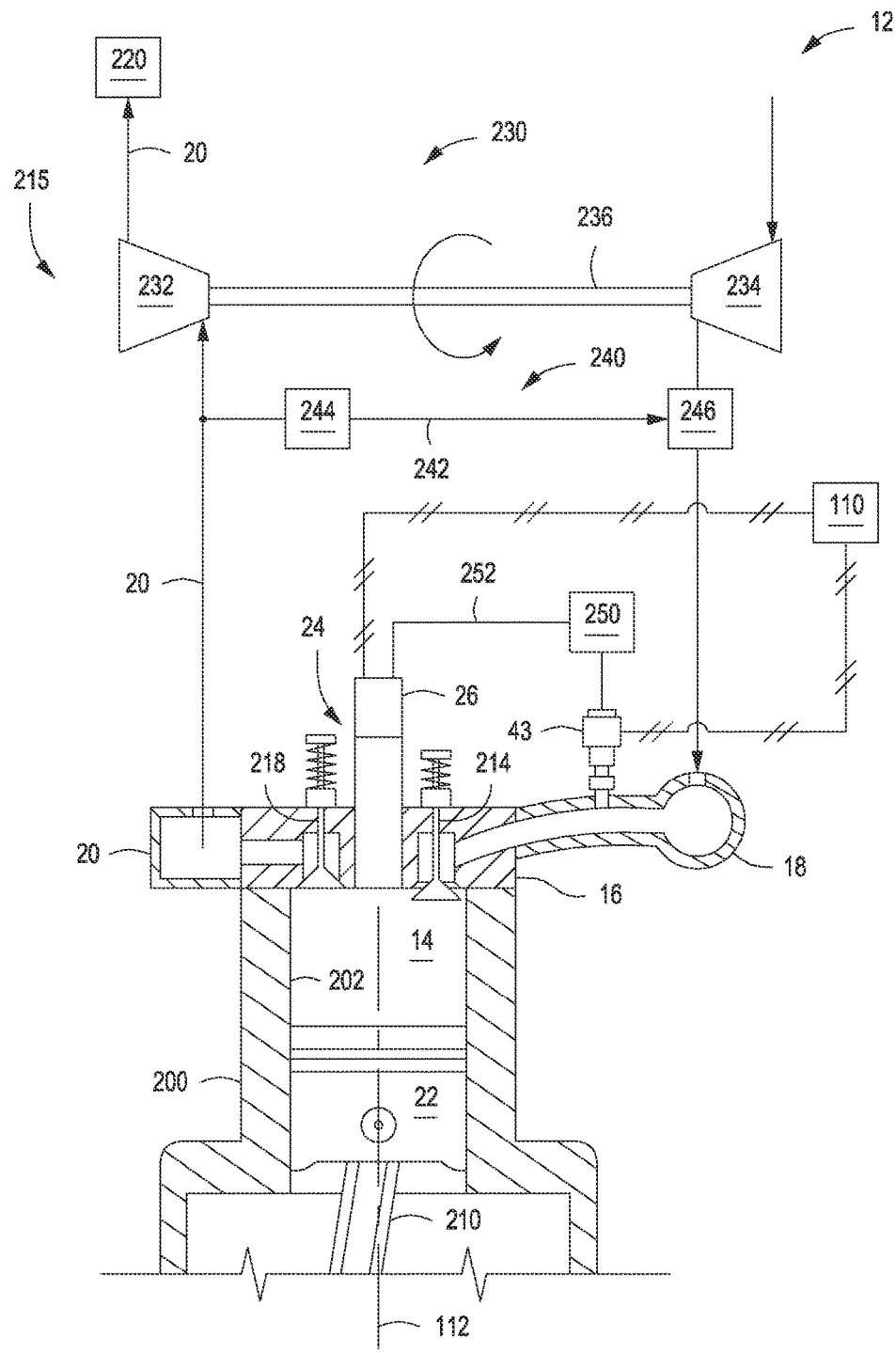
FIG. 2 is a schematic cross-sectional view of an internal combustion engine, according to an aspect of the disclosure.

FIG. 2 shows a schematic cross-sectional view of an IC engine 12, according to an aspect of the disclosure. The IC engine 12 includes a block 200 defining at least one cylinder bore 202 therein, at least one piston 22 disposed in sliding engagement with the cylinder bore 202, a head 16 disposed on the block 200, and a pre-chamber assembly 24. The cross section in FIG. 2 is taken along a plane including a longitudinal axis 112 centered within the bore 202.

The cylinder bore 202, the piston 22, the head 16, and the pre-chamber assembly 24 define, at least partly, a main combustion chamber 14. A volume of the main combustion chamber 14 may vary with the location of the piston 22 relative to the head 16, such that the volume of the main combustion chamber 14 is at a maximum when the piston 22 is located at Bottom Dead Center (BDC) of its stroke, and the volume of the main combustion chamber 14 is at a minimum when the piston 22 is located at Top Dead Center (TDC) of its stroke.

The IC engine 12 may operate according to a four-stroke cycle, including an intake stroke (from TDC to BDC), a compression stroke (from BDC to TDC), an expansion stroke (from TDC to BDC), and an exhaust stroke (from BDC to TDC). Alternatively, the IC engine 12 may operate according to a two-stroke cycle, including a compression/exhaust stroke (from BDC to TDC) and an expansion/exhaust/intake stroke (from TDC to BDC). It will be appreciated that the IC engine 12 may also operate according to any known modifications of the four-stroke cycle or the two-stroke cycle, including, but not limited to, the Miller Cycle, for example.

According to an aspect of the disclosure, the engine 12 is a lean-burn engine. As used herein, a "lean-burn" engine is an engine that at least temporarily operates under lean conditions in which the overall concentration of fuel in the fuel-oxidizer mixture is less than stoichiometric. Unless specified otherwise, the stoichiometric ratio of fuel to oxidizer is the proportion of fuel quantity to oxidizer quantity that results in no excess fuel and no excess oxygen upon a complete theoretical combustion of the mixture. Or in other words, the stoichiometric ratio of fuel to oxidizer is the proportion of fuel quantity to oxidizer quantity that results in all fuel and all oxygen being consumed upon a theoretical complete combustion of the mixture. The stoichiometric ratio of fuel to oxidizer may be calculated on either a molar or mass basis.

An actual fuel-to-oxidizer ratio may be normalized by the stoichiometric fuel-to-oxidizer ratio to yield an equivalence ratio. As used herein, unless specified otherwise, a mixture having an equivalence ratio less than one is fuel lean and will result in excess oxygen and no unburned fuel upon complete combustion, and a mixture having an equivalence ratio greater than one is fuel rich and will result in unburned fuel and no excess oxygen upon complete combustion. Thus, a lean-burn engine may at least temporarily operate with a fuel-oxidizer mixture having an overall equivalence ratio less than one. It will be appreciated that real combustion processes may not proceed to theoretical completion, and therefore, real combustion of lean mixtures may result in trace amounts of unburned fuel in the combustion products.

The piston 22 is pivotally connected to a crankshaft (not shown) via a connecting rod 210 for transmitting mechanical power therebetween. Although only one piston 22 and cylinder bore 202 are shown in FIG. 2, it will be appreciated that the IC engine 12 may be configured to include any number of pistons and cylinder bores to suit a particular design or application.

The IC engine 12 receives a flow of oxidizer from an intake duct 18. One or more intake valves 214 effect selective fluid communication between the intake duct 18 and the main combustion chamber 14. The IC engine 12 discharges a flow of exhaust to the exhaust system 215 via an exhaust duct 20. One or more exhaust valves 218 effect selective fluid communication between the main combustion chamber 14 and the exhaust duct 20. The intake valves 214 and the exhaust valves 218 may be actuated by a cam/push-rod/rocker arm assembly (not shown), a solenoid actuator, a hydraulic actuator, or by any other cylinder valve actuator known in the art to open or close intake or exhaust valves. It will be appreciated that the intake duct 18 and the exhaust duct 20 may compose portions of an intake manifold and an exhaust manifold, respectively, when the IC engine 12 includes a plurality of cylinder bores.

The exhaust system 215 may include an exhaust aftertreatment system 220 for trapping exhaust constituents, converting an exhaust constituent from one composition to another composition, or both. The exhaust aftertreatment system 220 may include a particulate filter, a nitrogen oxide (NOx) conversion module, an oxidation catalyst, an acoustic muffler, combinations thereof, or any other exhaust aftertreatment device known in the art.

Referring still to FIG. 2, the IC engine 12 may include a turbocharger 230 having a turbine 232 operably coupled to a compressor 234 via a shaft 236. The turbine 232 receives a flow of exhaust gas via the exhaust duct 20 and extracts mechanical work from the exhaust gas by expansion of the exhaust gas therethrough. The mechanical work extracted from the turbine 232 from the flow of exhaust gas is transmitted to the compressor 234 via the shaft 236. The compressor 234 receives a flow of oxidizer, such as, for example, ambient air, and performs work on the flow of oxidizer by compression thereof. It will be appreciated that the IC engine 12 may include a supercharger in place of or in addition to the turbocharger 230.

Additionally, the IC engine 12 may include an Exhaust Gas Recirculation (EGR) loop 240 for conveying exhaust gas into the oxidizer flow. The EGR loop 240 may include an EGR conduit 242 in fluid communication with the exhaust duct 20 upstream of the turbine 232, and in fluid communication with the intake duct 18 downstream of the compressor 234, effecting a so-called "high-pressure EGR loop." Alternatively, it will be appreciated that the IC engine 12 may also be equipped with a low-pressure EGR loop, where the EGR conduit 242 is in fluid communication with the exhaust duct 20 downstream of the turbine 232, and in fluid communication with the intake duct 18 upstream of the compressor 234.

The EGR conduit 242 may incorporate an EGR conditioning module 244 that effects cooling, filtering, or throttling of exhaust gases flowing therethrough, combinations thereof, or any other exhaust gas processing known to benefit the operation of the EGR loop 240. The EGR conduit 242 may fluidly couple with the intake duct 18 at a mixing device 246 configured to effect mixing between the recirculated exhaust gas and the flow of oxidizer.

The IC engine 12 receives combustible fuel from a fuel supply system 250. The fuel supply system 250 may include fuel storage, compressors, pumps, valves, regulators, instrumentation, or any other elements known in the art to be useful for supplying a flow of fuel. The pre-chamber assembly 24 is disposed in direct fluid communication with the main combustion chamber 14, and may receive a flow of fuel from the fuel supply system 250 via a pre-chamber fuel conduit 252 and a pre-chamber fuel injector 26. Accordingly, the fuel supply system 250 may be in fluid communication with the main combustion chamber 14 via the pre-chamber assembly 24. A main fuel injector 43 may be disposed in fluid communication with the intake duct 18 upstream of the intake valve 214, or alternatively, the main fuel injector 43 may be disposed in direct fluid communication with the main combustion chamber 14. Accordingly, main fuel injector 43 may be in fluid communication with the main combustion chamber 14 via a flow path that does not include the pre-chamber assembly 24. The pre-chamber fuel injector 26 and the main fuel injector 43 may each be operatively coupled to the controller 110, such that the controller 110 is configured to selectively effect fluid communication between the fuel supply system 250 and the pre-chamber assembly 24 and the main combustion chamber 14 via the pre-chamber fuel injector 26 and the main fuel injector 43, respectively.

The fuel supply system 250 may include sources of different combustible fuels. According to one aspect of the disclosure, the fuel supply system 250 is configured to provide a first fuel to the pre-chamber assembly 24, and a second fuel to the main combustion chamber 14, where the first fuel differs from the second fuel in at least one of supply pressure, matter phase, and chemical composition. Alternatively, the fuel supply system 250 may be configured to deliver the same fuel to each of the pre-chamber assembly 24 and the main combustion chamber 14.

The fuel supply system 250 may be configured to deliver a liquid fuel, a gaseous fuel, or combinations thereof. Liquid fuels may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art. Gaseous fuels may include natural gas, methane, propane, hydrogen, carbon monoxide, biogas, syngas, combinations thereof, or any other combustible gas known in the art. It will be appreciated that a gaseous fuel may include inert constituents, such as carbon dioxide, nitrogen, steam, combinations thereof, or any other inert gas known in the art.

According to an aspect of the disclosure, the fuel supply system 250 is configured to deliver natural gas. According to another aspect of the disclosure, the fuel supply system 250 is configured to deliver a combustible gas comprising at least 50% methane by mole. According to yet another aspect of the disclosure, the fuel supply system 250 is configured to deliver a fuel with a sufficiently low cetane value, or a sufficiently high octane value, for use in a spark-ignition reciprocating IC engine, such as natural gas or gasoline, for example.

The pre-chamber fuel injector 26 is configured to effect selective fluid communication between the fuel supply system 250 and the pre-chamber assembly 24. For example, the pre-chamber fuel injector 26 may assume one of the following two configurations. According to a first configuration, the pre-chamber fuel injector 26 blocks fluid communication between the fuel supply system 250 and the pre-chamber assembly 24 via the pre-chamber fuel conduit 252. According to a second configuration, the pre-chamber fuel injector 26 effects fluid communication between the fuel supply system 250 and the pre-chamber assembly 24 via the pre-chamber fuel conduit 252.

The pre-chamber fuel injector 26 may include an actuator configured to change the fluid configuration of the pre-chamber fuel injector 26 under the control of the controller 110. The actuator for the pre-chamber fuel injector 26 may include a solenoid actuator, a hydraulic actuator, a pneumatic actuator, a mechanical actuator, such as, for example a cam actuator, combinations thereof, or any other fuel injector actuator known in the art. The controller 110 may control an amount of fuel delivered to the pre-chamber assembly 24 via the pre-chamber fuel injector 26 by controlling an opening time duration of the pre-chamber fuel injector 26, an effective flow area of the pre-chamber fuel injector 26, or combinations thereof.

Similarly, the main fuel injector 43 is configured to effect selective fluid communication between the fuel supply system 250 and the main combustion chamber 14. For example, the main fuel injector 43 may assume one of the following two fluid configurations. According to a first configuration, the main fuel injector 43 blocks fluid communication between the fuel supply system 250 and the intake duct 18. According to a second configuration, the main fuel injector 43 effects fluid communication between the fuel supply system 250 and the intake duct 18.

The main fuel injector 43 may include an actuator configured to change the fluid configuration of the main fuel injector 43 under the control of the controller 110. The actuator for the main fuel injector 43 may include a solenoid actuator, a hydraulic actuator, a pneumatic actuator, a mechanical actuator, such as, for example a cam actuator, combinations thereof, or any other fuel injector actuator known in the art. The controller 110 may control an amount of fuel delivered to the main combustion chamber 14 via the main fuel injector 43 by controlling an opening time duration of the main fuel injector 43, an effective flow area of the main fuel injector 43, or combinations thereof The controller 110 may be in data communication with a user interface for receiving control inputs from an operator of the machine 10. Further, the controller 110 may be in data communication with the IC engine 12 via one or more data connections for receiving sensor signals from the IC engine 12, delivering control inputs to the IC engine 12, combinations thereof, or for transmitting any data known in the art to be relevant to operation of the IC engine 12. It will be appreciated that any data connections between the controller 110 and any other element of the IC engine 12 may include wired connections, wireless connections, combinations thereof, or any other data communication means known in the art.

The controller 110 may be any purpose-built processor for effecting control of the IC engine 12, the machine 10, or combinations thereof. It will be appreciated that the controller 110 may be embodied in a single housing, or a plurality of housings distributed throughout the machine 10. Further, the controller 110 may include power electronics, preprogrammed logic circuits, data processing circuits, volatile memory, non-volatile memory, software, firmware, combinations thereof, or any other controller structures known in the art.

Figure 3:
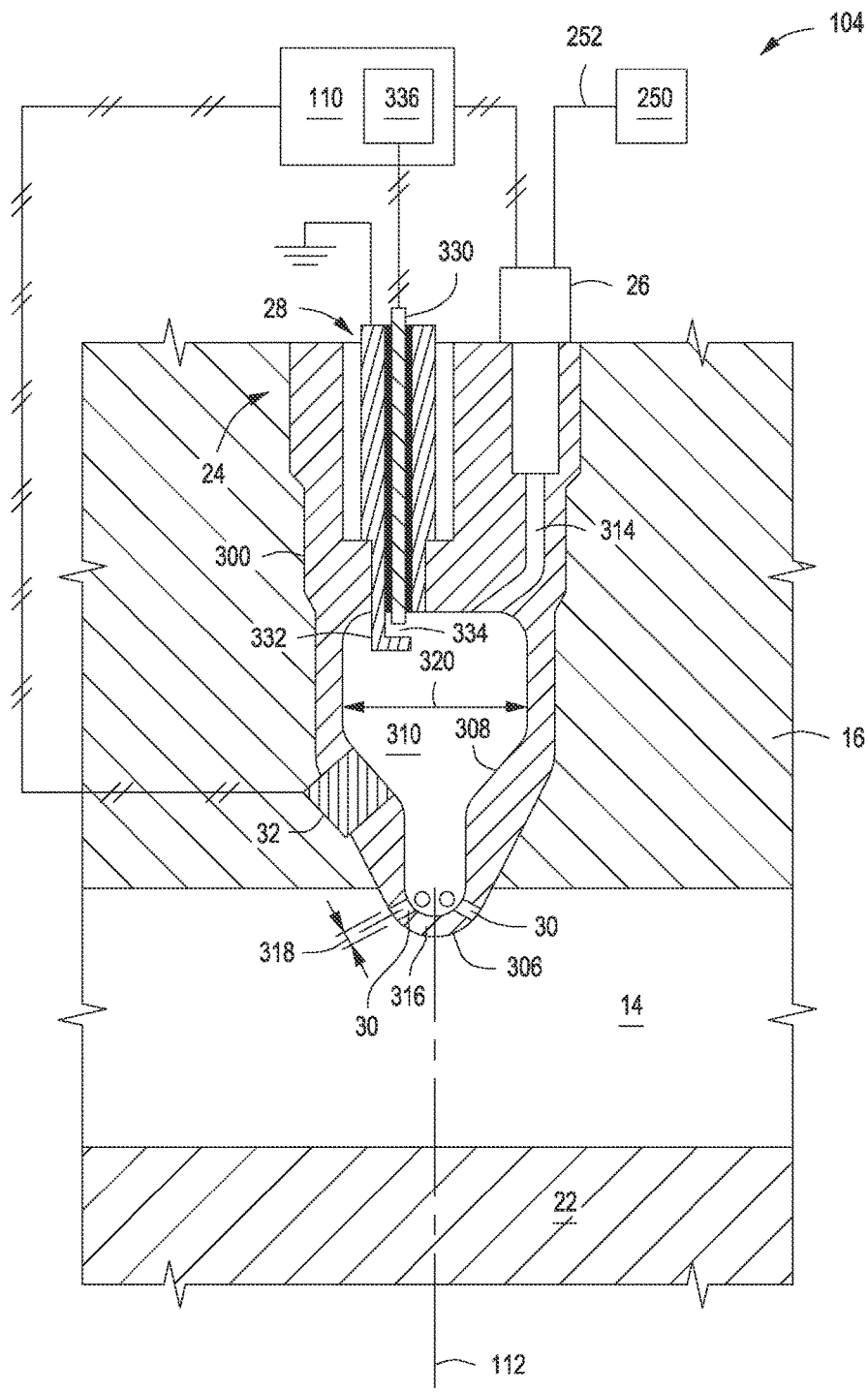
FIG. 3 is a schematic cross-sectional view of a pre-chamber assembly installed in an internal combustion engine, according to an aspect of the disclosure.

FIG. 3 is a schematic cross-sectional view of a pre-chamber assembly 24 installed in an IC engine 12, according to an aspect of the disclosure. The illustrated pre-chamber assembly 24 includes a body 300, an ignition energy source 28, a heating element 32, and a pre-chamber fuel injector 26.

An external surface 306 of the pre-chamber assembly 24 at least partly defines the main combustion chamber 14. According to an aspect of the disclosure, the external surface 306 may project beyond the head 16 into the main combustion chamber 14. An internal surface 308 of the pre-chamber assembly 24 defines a combustion pre-chamber 310, a plurality of outlet orifices 30, and a pre-chamber fuel supply conduit 314. According to an aspect of the disclosure, an internal volume of the combustion pre-chamber 310 is approximately 1-3% of an internal volume of the main combustion chamber 14.

The outlet orifices 30 extend through a wall 316 of the body 300 and effect fluid communication between the combustion pre-chamber 310 and the main combustion chamber 14. According to an aspect of the disclosure, the outlet orifices 30 consists of six to eight outlet orifices. According to another aspect of the disclosure, a transverse dimension 318 of one or more of the outlet orifices 30 is less than 25% of a transverse dimension 320 of the combustion pre-chamber 310. According to another aspect of the disclosure, a transverse dimension 318 of one or more of the outlet orifices 30 is less than 15% of a transverse dimension 320 of the combustion pre-chamber 310. Accordingly, fluid flow from the combustion pre-chamber 310 to the main combustion chamber 14 via the plurality of outlet orifices 30 is accelerated by a reduction in flow area through the plurality of outlet orifices 30 to form fluid jets projecting into the main combustion chamber 14.

The internal surface 308 of the body 300 may define a pre-chamber fuel supply conduit 314 that is in fluid communication with the pre-chamber fuel injector 26 and the combustion pre-chamber 310. Accordingly, the pre-chamber fuel injector 26 may effect fluid communication between the fuel supply system 250 and the combustion pre-chamber 310 via the pre-chamber fuel supply conduit 314. Although FIG. 3 shows the pre-chamber fuel supply conduit 314 integrated within the body 300, it will be appreciated that the pre-chamber fuel supply conduit 314 could also be embodied as a separate conduit external to the body 300 and passing through the body 300 to effect fluid communication with the combustion pre-chamber 310.

According to an aspect of the disclosure, the ignition energy source 28 is an electric spark plug including an anode 330 and a cathode 332. The anode 330 and the cathode 332 are electrically insulated from one another and define a spark gap 334 within the combustion pre-chamber 310. The cathode 332 may be electrically coupled to a chassis ground of the pre-chamber assembly 24, the engine 12, the machine 10, or combinations thereof. The anode 330 is electrically coupled to the controller 110 via a high voltage source 336, where the controller 110 is configured to effect application of a voltage difference across the spark gap 334 sufficient to cause an electric spark to arc across the spark gap 334. In turn, the electric spark across the spark gap 334 may be configured to effect a desired degree or intensity of chemical reactions between a fuel and an oxidizer disposed within the combustion pre-chamber 310.

Alternatively or additionally, the ignition energy source 28 may include a laser energy source optically coupled to the combustion pre-chamber 310. The laser energy source may be operatively coupled to the controller 110, and the controller 110 may be configured to cause the laser energy source to transmit a beam of laser light into the combustion pre-chamber 310 for effecting a desired degree or intensity of chemical reactions between a fuel and an oxidizer disposed within the combustion pre-chamber 310.

In addition to the ignition energy source 28, the pre-chamber assembly 24 includes a heating element 32 disposed in thermal communication with the combustion pre-chamber 310. According to an aspect of the disclosure, the heating element 32 is an electrical resistance heater that is operatively coupled to the controller 110, where the controller 110 is configured to effect a desired heat flux into the combustion pre-chamber 310, effect a desired fluid temperature within the combustion pre-chamber 310, effect a desired surface temperature of the heating element 32, or combinations thereof. The heating element 32 may be advantageously operated to promote medium temperature combustion kinetics, less than about 1700 degrees Fahrenheit (1200 K), without transitioning to sustained, higher temperature reactions capable of proceeding spontaneously to a complete reaction. It will be appreciated that the heating element 32 may be incorporated into the body 300, disposed entirely within the combustion pre-chamber 310, or extend from the body 300 into the combustion pre-chamber 310.

The heating element 32 may heat fluid within the pre-chamber 310 to a temperature sufficient to induce medium temperature combustion of fuel and oxidizer in the pre-chamber 310. As used herein, "medium temperature combustion" refers to combustion that occurs in a temperature range of about 980 degrees Fahrenheit (800 K) to about 1700 degrees Fahrenheit (1200 K). The medium temperature range combustion in the pre-chamber 310 may advantageously induce the production of hydrogen peroxide ($H_2O_2$), as the production of $H_2O_2$ from $CH_4$ and $O_2$ occurs at temperature range of about 800 degrees Fahrenheit (700 K) to about 1250 degrees Fahrenheit (950 K) (see FIG. 4). The $H_2O_2$ may then be transferred to the main combustion chamber 14 via the orifices 30, and the $H_2O_2$ may dissociate to provide hydroxyl radicals (OH.) under appropriate conditions (see further details below). The OH. radicals may accelerate and stabilize combustion of the lean fuel-oxidizer mixture in the main combustion chamber 14, according to established mechanisms. Thus, the present disclosure leverages the ability of the heating element 32 to induce the production of $H_2O_2$ as a precursor to combustion-stabilizing OH. radicals to promote combustion stability in the main combustion chamber 14 under lean conditions.

The heating element 32 may have a surface temperature sufficient to heat fluid in the pre-chamber to induce medium temperature combustion in the pre-chamber 310, while remaining below a temperature that is sufficient to induce auto-ignition of the lean fuel-oxidizer mixture in the main combustion chamber 14. Accordingly, independent control over ignition in the main combustion chamber 14 may be maintained by control of the ignition energy source 28.

For example, the heating element 32 may have a surface temperature in a range from about 1160 degrees Fahrenheit (900 K) to about 2420 degrees Fahrenheit (1600 K), although the surface temperature may vary depending on the size and design of the heating element 32. Furthermore, the heating element 32 may be located inside of the pre-chamber 310 and positioned near the fuel injector 26 in order to heat the fuel as it enters the pre-chamber 310. In order to enhance heat transfer from the heating element 32 to the fuel, the heating element 32 may be oriented substantially perpendicular to a flow path of the fuel as it enters the pre-chamber 310 from the fuel injector 26. However, the heating element 32 may also be parallel or otherwise angled with respect to the fuel flow path.

Figure 11:
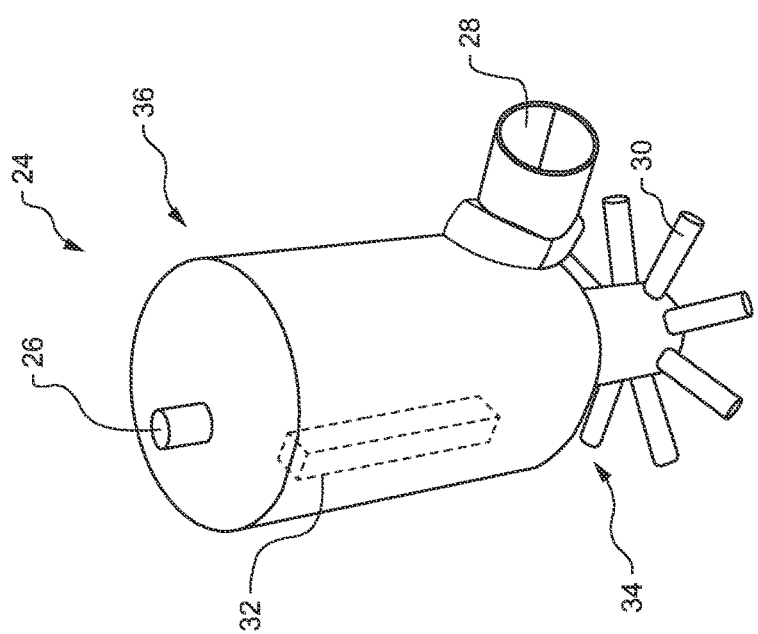
FIG. 11 is a schematic view of a pre-chamber assembly, according to an aspect of the disclosure.
Figure 5:
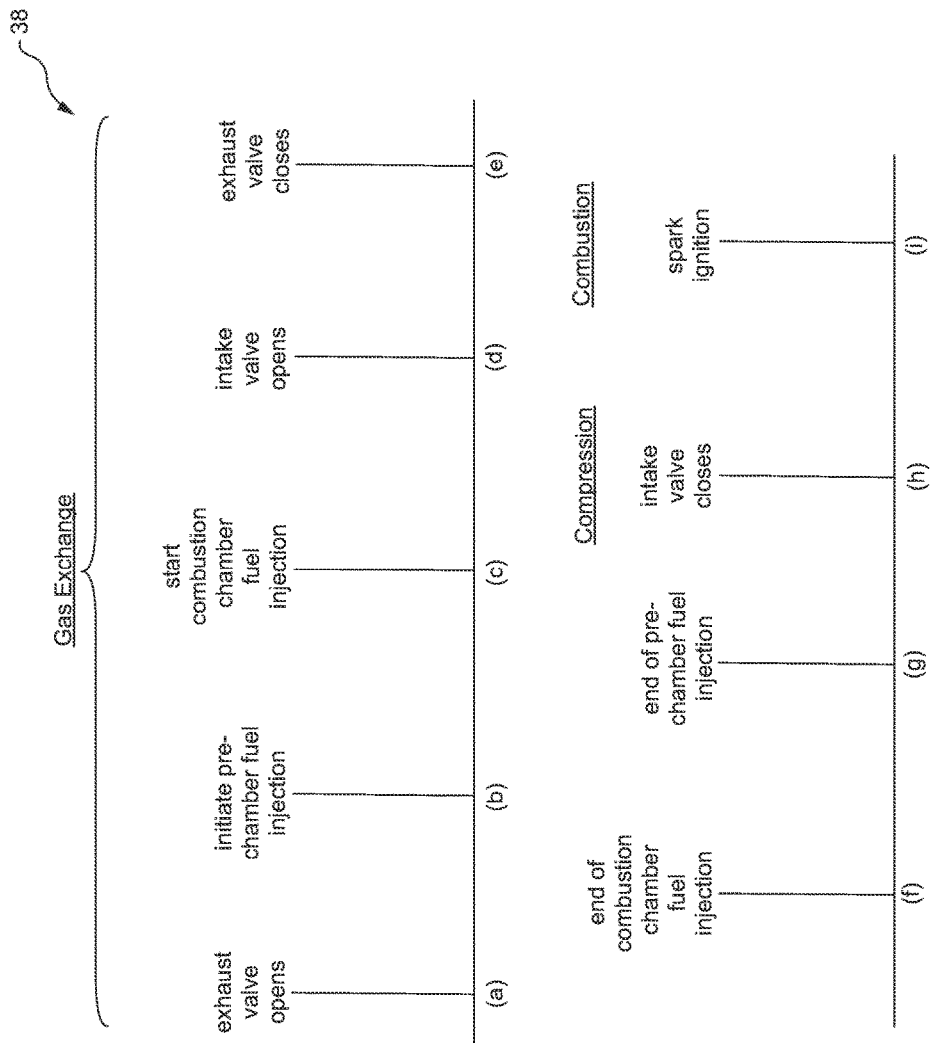
FIG. 5 is a timeline for a series of events in a piston cycle of the IC engine, according to an aspect of the disclosure.

As shown in FIG. 11, the fuel injector 26 and the heating element 32 may be disposed near a top portion 36 of the pre-chamber 310, while the ignition energy source 28 and the orifices 30 may be disposed near the bottom portion 34 of the pre-chamber 310. However, it will be understood that the fuel injector 26, the heating element 32, the ignition energy source 28, and the orifices 30 may have alternative positions in the pre-chamber assembly 24, other than those shown in either FIG. 3 or FIG. 11.

Figure 4:
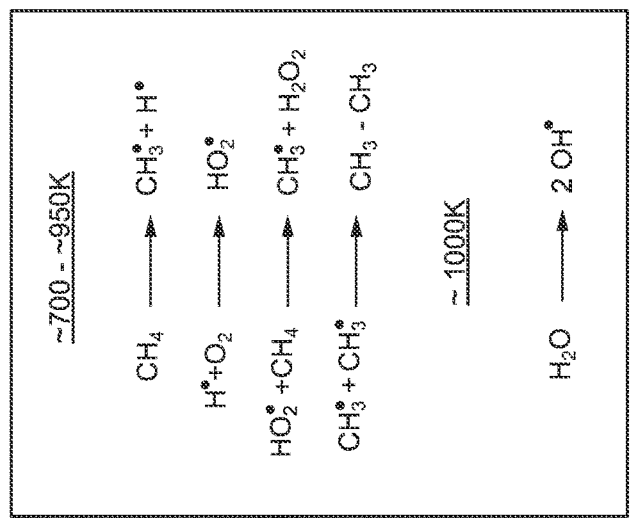
FIG. 4 is a mechanism for a reaction that may occur in the pre-chamber to produce peroxide ($H_2O_2$) and hydroxyl radicals (OH.), according to an aspect of the disclosure.

FIG. 4 shows a reaction mechanism for producing $H_2O_2$ from the fuel ($CH_4$) and oxygen ($O_2$) in the pre-chamber 310. When fluid temperatures in the pre-chamber 310 reach the range of at least about 800 degrees Fahrenheit (700 K) to about 1250 degrees Fahrenheit (950 K) due to heat transfer from the heating element 32 to the fuel-oxidizer mixture, the $CH_4$ may disassociate to produce methyl radicals ($CH_3$.) and hydrogen radicals (H.). The hydrogen radicals (H.) may react with $O_2$ to produce hydroperoxyl radicals ($HO_2$.), which may then abstract a hydrogen from another $CH_4$ molecule to produce $H_2O_2$ and $CH_3$. radicals. The $CH_3$. radicals may then recombine to produce ethane ($CH_3$—$CH_3$). At temperatures above 1340 degrees Fahrenheit (1000 K), the produced $H_2O_2$ may disassociate to form the OH. radicals, as shown. In some cases, the OH. radicals may be formed in the pre-chamber 310 if local temperatures (e.g., at the surface of the heating element 32) are at least 1340 degrees Fahrenheit (1000 K). Otherwise, the OH. radicals may be formed in the main combustion chamber 14, the pre-chamber 310, or both, upon ignition with the ignition energy source 28, which may instantaneously raise fluid temperatures in both chambers to temperatures well above 1700 degrees Fahrenheit (1200 K). It will be appreciated that spark ignition by the ignition energy source 28 alone will not likely produce $H_2O_2$ from fuel ($CH_4$) and $O_2$ because the heat supply is instantaneous and may not provide enough time for the reactions to occur. Further, it will be appreciated that the controller 110 may be configured to control power delivered to the heating element 32 to effect any of the desired temperature states for the pre-chamber assembly, or its fluid contents, as described herein.

Referring now to FIGS. 5-9, a series of events that may be involved in a single piston cycle 38 of the lean-burn engine 12 are shown. In particular, FIG. 5 lists some of the events that occur during the gas-exchange process, the compression stage, and the combustion stage of the piston cycle 38, with the spacing between the events not necessarily being representative of the actual time intervals. FIGS. 6-9 illustrate some of the events of FIG. 5 as they occur in the IC engine 12.

Beginning with the gas-exchange process, an exhaust valve 40 of the exhaust duct 20 may open to allow an exhaust gas 42 to flow out of the main combustion chamber 14 through the exhaust duct 20 (event (a)). During this time, the exhaust gas 42 may be pushed out of the main combustion chamber 14 and into the exhaust duct 20 by the upward movement of the piston 22 (see FIG. 6). In addition, pre-chamber fuel injection through the fuel injector 26 and main combustion chamber fuel injection through a fuel injector 43 on the intake duct 18 may be initiated to start the flow of fuel 44 into the pre-chamber 310 and the intake duct 18, respectively (events (b)-(c) and FIG. 6). Thus, the fuel 44 in the intake duct 18 may be mixed with oxidizer to produce a lean fuel-oxidizer mixture for delivery to the main combustion chamber 14. In addition, the fuel 44 in the pre-chamber 310 may mix with oxidizer and may be heated by the heating element 32 to induce medium temperature combustion and the production of $H_2O_2$. In some cases, the $H_2O_2$ produced in the pre-chamber 310 may disassociate and produce OH. radicals if local temperatures are at least 1340 degrees Fahrenheit (1000 K), such as near the surface of the heating element 32. If produced, such OH. radicals may accelerate and stabilize combustion in the pre-chamber 310 as well.

Once the exhaust gas 42 is sufficiently evacuated from the main combustion chamber 14, an intake valve 46 may open to allow a fresh lean fuel-oxidizer mixture 48 to enter the main combustion chamber 14 from the intake duct 18 and replace the evacuated exhaust gases, and the exhaust valve 40 may close (events (d)-(e) and FIG. 7). In addition, suction created in the main combustion chamber 14 by the downward movement of the piston 22 may draw the fresh lean fuel-oxidizer mixture 48 into the main combustion chamber 14. The downward movement of the piston 22 may also draw $H_2O_2$/OH. radicals 50 (as well as other gases) through the orifices 30 of the pre-chamber 310 and into the main combustion chamber 14 (see FIG. 7). In this way, the $H_2O_2$/OH. radicals 50 may be pre-positioned in the main combustion chamber 14 during the gas-exchange process prior to initiation of combustion in the main combustion chamber 14 by the ignition energy source 28. It will be appreciated that OH. may not be kinetically favored at temperatures below 1000 K, and therefore, OH. in the main combustion chamber 14 may convert rapidly to other species when the temperature in the main combustion chamber 14 is less than 1000 K.

After completion of the gas-exchange process (i.e., events (a)-(e)), the fuel injections in the intake duct 18 and the pre-chamber assembly 24 may cease (events (f)-(g)), and the compression stage may begin. Specifically, the intake valve 46 may close (event (h)) and the lean fuel-oxidizer mixture 48 in the main combustion chamber 14 may be compressed by the upward movement of the piston 22 (see FIG. 8). Furthermore, the upward movement of the piston 22 may transport some of the lean fuel-oxidizer mixture 48 into the pre-chamber 310 via the orifices 30 to provide a source of both fuel and $O_2$ for the production of $H_2O_2$ in the pre-chamber 310 (see FIG. 8).

High temperature combustion of the lean fuel-oxidizer mixture in the main combustion chamber 14 may then be initiated by ignition of the ignition energy source 28 (event (i) and FIG. 9). As used herein, "high temperature combustion" refers to combustion that occurs at temperatures higher than 1700 degrees Fahrenheit (1200 K). In particular, activation of the ignition energy source 28 may produce a high temperature flame 52 (i.e., >1700 degrees Fahrenheit (1200 K)) that jets out of the orifices 30 and ignites the lean fuel-oxidizer mixture 48 in the main combustion chamber 14. The $H_2O_2$ in the main combustion chamber 14 may then disassociate to produce OH. radicals which may accelerate and stabilize the combustion in the main combustion chamber 14. The combustion releases energy to drive the downward movement of the piston 22 (see FIG. 9), and the piston cycle 38 may then repeat. As will be appreciated, the piston cycle 38 (gas-exchange, compression, and combustion) proceeds with four strokes of the piston 22.

Figure 10:
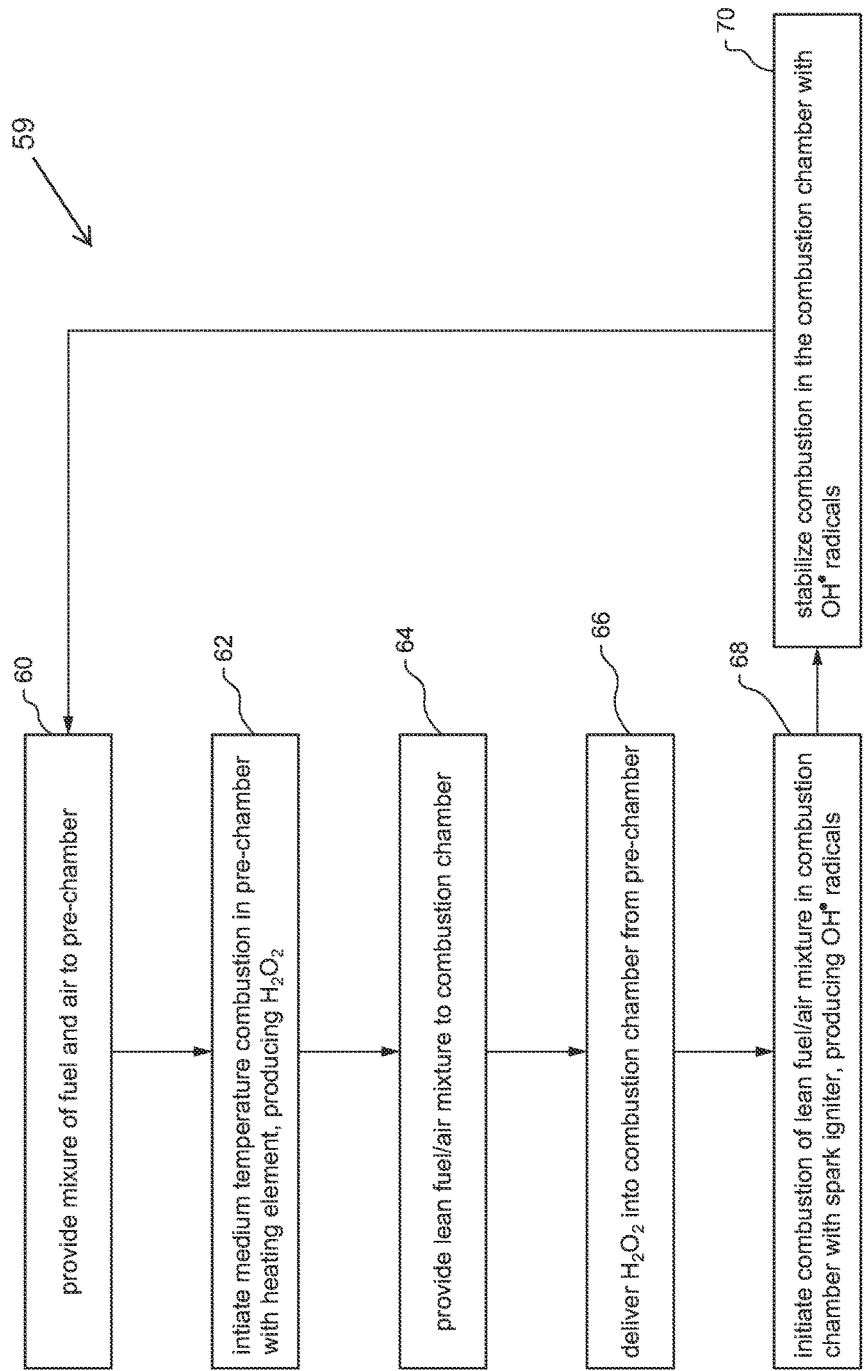
FIG. 10 is a flowchart of a method for stabilizing combustion in the IC engine, according to an aspect of the disclosure.

FIG. 10 is a flowchart of a method 59 for stabilizing combustion in the IC engine, according to an aspect of the disclosure. It will be appreciated that the steps depicted in FIG. 10 are part of the piston cycle 38 described above and are thus cyclic and repetitive, as shown. Beginning with Step 60, a mixture of fuel and oxidizer are provided to the pre-chamber 310. As explained above, the fuel and oxidizer mixture in the pre-chamber 310 is a mixture of the fuel 44 from the fuel injector 26 and fuel-oxidizer mixture 48 originating from the main combustion chamber 14 during the compression stage (see FIG. 8), perhaps as well as residual gases from the previous piston cycle. In particular, the supply of the fuel 44 to the pre-chamber 310 from the fuel injector 26 may be controlled to provide at a stoichiometric or leaner ratio between fuel and oxidizer in the pre-chamber 310 (i.e., equivalence ratio less than or equal to one) to promote $H_2O_2$ production by providing an ample supply of $O_2$. According to an aspect of the disclosure, the equivalence ratio in the pre-chamber 310 is less than 0.9.

Next in Step 62, medium temperature combustion of the fuel and oxidizer in the pre-chamber 310 may be initiated by the heating element 32, thereby producing $H_2O_2$ as well as OH. radicals if local temperatures are high enough. A lean fuel-oxidizer mixture may then be provided to the main combustion chamber 14 from the intake duct 18 (Step 64), and $H_2O_2$ (as well as any OH. radicals) may be delivered to the main combustion chamber 14 from the pre-chamber 310 (Step 66). As explained above, the lean fuel-oxidizer mixture 48 and the $H_2O_2$/OH. radicals 50 may be supplied to the main combustion chamber 14 during the gas-exchange process of the piston cycle 38 (see FIG. 7). Combustion may then be initiated in the main combustion chamber 14 by operation of the ignition energy source 28, thereby producing OH. radicals from the $H_2O_2$ in the main combustion chamber 14 (Step 68). The OH. radicals may then accelerate and stabilize the combustion of the lean fuel-oxidizer mixture in the main combustion chamber 14 (Step 70), and the series of steps may repeat in subsequent combustion cycles, as shown.

Although the combustion-stabilization approach of the present disclosure is taught in the context of a natural gas lean-burn engine, it will be understood that the concepts disclosed herein may be applied to any type of engine having a pre-chamber.

INDUSTRIAL APPLICABILITY

The teachings of the present disclosure may find industrial applicability in a variety of settings such as, but not limited to, applications using natural gas lean-burn engines. The lean-burn engine disclosed herein uses a heating element positioned in a pre-chamber to induce medium temperature combustion and the production of $H_2O_2$ in the pre-chamber.

While decreasing the equivalence ratio of an already fuel lean mixture in the main combustion chamber 14 tends to reduce the amount of NOx formed, leaner equivalence ratios may pose ignition challenges. For example, in spark ignition engines, leaner fuel-oxidizer mixtures may require higher ignition energy to ignite a self-sustaining flame front, may result in lower flame speeds through the fuel-oxidizer mixture, or both. Further, the challenges of igniting lean fuel-oxidizer mixtures may be compounded in spark ignition engines having large diameter pistons because the flame has to propagate a long distance from the point of ignition to the cylinder bore over the relatively short time duration of an expansion stroke. Failure to ignite and burn all of the fuel-oxidizer mixture in the main combustion chamber results in higher unburned fuel at the end of the power stroke, which may necessitate exhaust aftertreatment to convert the unburned fuel downstream of the exhaust valves, and which tends to decrease fuel efficiency.

Combustion pre-chambers are known for, in effect, amplifying the ignition energy of a spark by igniting a small mixture of fuel and oxidizer within the pre-chamber and delivering jets of combustion products from the pre-chamber out into a main combustion chamber. According to an aspect of the disclosure, fuel delivered to the combustion pre-chamber is less than about 3% of the total fuel delivered to the main combustion chamber during the same cycle.

Some conventional approaches to operating combustion pre-chambers involve targeting a mixture within the pre-chamber that is close to stoichiometric. However, as lower NOx emissions are targeted, NOx generation within the pre-chamber may present a significant contribution to overall in-cylinder NOx formation, even though the amount of fuel burned in the combustion pre-chamber is relatively small. Further, the high flame temperatures resulting from stoichiometric operation of a pre-chamber may reduce the useful life of the pre-chamber.

Alternatively, operating conventional pre-chambers with a lean fuel-oxidizer mixture may help to reduce NOx formation in the pre-chamber by lowering flame temperatures, but may pose too much compromise to the efficacy of the pre-chamber as an ignition source for the main combustion chamber. However, Applicant discovered advantageous structures and methods for effecting partial combustion of lean fuel-oxidizer mixtures within a pre-chamber using a heating element to generate beneficial intermediate species, such as $H_2O_2$, OH. radicals, or combinations thereof, which enabled subsequent robust ignition of a lean fuel-oxidizer mixture in the main combustion chamber.

The $H_2O_2$ may be supplied to the main combustion chamber prior to spark ignition to provide a source of combustion-stabilizing OH. radicals. Thus, the concepts disclosed herein may be used to improve the combustion stability in lean-burn engines (in both the pre-chamber and the main combustion chamber), as well as to extend lean-burn regimes to overall leaner conditions to further reduce $NO_x$ emissions. Moreover, the heating element 32 disclosed herein is operated separately from the ignition energy source 28, such that independent control over the spark ignition in the main combustion chamber 14 is separately maintained. It will be appreciated that the technology disclosed herein may find wide industrial applicability in a wide range of applications such as, but not limited to, power generation, transportation, mining, and farming.

Accordingly, by providing apparatus and methods for effecting partial, low-temperature combustion within a combustion pre-chamber 310 using a heating element 32, a robust ignition source is provided to the main combustion chamber 14 while simultaneously reducing NOx emissions generated within the combustion pre-chamber 310 and extending the useful life of the pre-chamber assembly 24. Further, aspects of the disclosure advantageously provide a method for producing combustion intermediate species, such as $H_2O_2$, OH. radicals, or combinations thereof, within the pre-chamber assembly 24, absent an external gas reformer to provide the combustion intermediate species to the pre-chamber assembly 24.

Any of the methods or functions described herein may be performed by, effected, or controlled by the controller 110. Further, any of the methods or functions described herein may be embodied in a machine-readable non-transitory medium for causing the controller 110 to perform the methods or functions described herein. Such machine-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a machine, or combinations thereof, including other methods and functions not described herein It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. An engine, comprising:
 a main combustion chamber;
 an intake duct configured to provide a lean fuel-oxidizer mixture to the main combustion chamber;
 a pre-chamber in fluid communication with the main combustion chamber, the pre-chamber including
  an ignition energy source operatively coupled to the pre-chamber, and
  a heating element in thermal communication with the pre-chamber; and
 a controller operatively coupled to the ignition energy source and the heating element, the controller being configured to
 initiate combustion of the lean fuel-oxidizer mixture in the main combustion chamber by activating the ignition energy source, and
 heat fuel and oxidizer in the pre-chamber via the heating element to a temperature sufficient to produce hydrogen peroxide ($H_2O_2$) in the pre-chamber.

2. The engine of claim 1, wherein the engine is fluidly coupled to a supply of natural gas as fuel.

3. The engine of claim 1, wherein the pre-chamber is configured to deliver the $H_2O_2$ to the main combustion chamber prior to initiation of the combustion of the lean fuel-oxidizer mixture by the ignition energy source.

4. The engine of claim 3, wherein the $H_2O_2$ in the main combustion chamber disassociates into hydroxyl radicals (OH.) upon initiation of the combustion of the lean fuel-oxidizer mixture by the ignition energy source, and wherein the OH. radicals stabilize the combustion of the lean fuel-oxidizer mixture in the main combustion chamber.

5. The engine of claim 1, wherein the controller is further configured to initiate medium temperature combustion of the fuel and the oxidizer in the pre-chamber by modulating a heat output of the heating element.

6. The engine of claim 5, wherein the controller is further configured to effect a temperature of the heating element that is at least 900 K, and that is below a temperature sufficient to cause auto-ignition of the lean fuel-oxidizer mixture in the main combustion chamber.

7. The engine of claim 6, wherein the controller is further configured to effect an equivalence ratio of a mixture of fuel and oxidizer in the pre-chamber that is not greater than one.

8. The engine of claim 1, wherein the pre-chamber further includes a fuel injector configured to provide at least a portion of the fuel to the pre-chamber, and
wherein the heating element is arranged substantially perpendicular to a flow path of the fuel from the fuel injector to the pre-chamber.

9. The engine of claim 7, wherein the engine is configured to undergo a gas-exchange process during which an exhaust gas is evacuated from the main combustion chamber and the lean fuel-oxidizer mixture enters the main combustion chamber from the intake duct.

10. The engine of claim 9, wherein the $H_2O_2$ is delivered to the main combustion chamber from the pre-chamber during the gas-exchange process.

11. The engine of claim 10, wherein the engine is configured to undergo a compression stage during which the lean fuel-oxidizer mixture in the main combustion chamber is compressed, and
wherein a portion of the lean fuel-oxidizer mixture enters the pre-chamber from the main combustion chamber during the compression stage.

12. An engine, comprising:
a main combustion chamber;
an intake duct configured to provide a lean fuel-oxidizer mixture to the main combustion chamber;
a pre-chamber in fluid communication with the main combustion chamber, the pre-chamber including
an ignition energy source operatively coupled to the pre-chamber, and
a heating element in thermal communication with the pre-chamber; and
a controller operatively coupled to the ignition energy source and the heating element, the controller being configured to
initiate a high temperature combustion of the lean fuel-oxidizer mixture in the main combustion chamber by activating the ignition energy source, and
initiate a medium temperature combustion of fuel and oxidizer in the pre-chamber by adjusting a heat output from the heating element, the medium temperature combustion generating hydrogen peroxide ($H_2O_2$) in the pre-chamber, and the $H_2O_2$ being configured to disassociate into hydroxyl radicals (OH.) that stabilize combustion in both the pre-chamber and the main combustion chamber.

13. The engine of claim 12, wherein the controller is further configured to deliver the $H_2O_2$ to the main combustion chamber prior to initiation of the high temperature combustion of the lean fuel-oxidizer mixture by activation of the ignition energy source.

14. The engine of claim 13, wherein the controller is further configured to dissociate the $H_2O_2$ in the main combustion chamber into hydroxyl radicals (OH.) by activation of the ignition energy source, thereby initiating the high temperature combustion of the lean fuel-oxidizer mixture in the main combustion chamber.

15. The engine of claim 14, wherein the engine is configured to undergo a gas exchange process during which an exhaust gas is evacuated from the main combustion chamber and the lean fuel-oxidizer mixture enters the main combustion chamber from the intake duct.

16. The engine of claim 15, wherein the $H_2O_2$ is delivered to the main combustion chamber during the gas exchange process.

17. The engine of claim 16, wherein the engine is configured to undergo a compression stage during which the lean fuel-oxidizer mixture in the main combustion chamber is compressed, and wherein a portion of the lean fuel-oxidizer mixture enters the pre-chamber from the main combustion chamber during the compression stage.

18. The engine of claim 17, wherein an equivalence ratio of a mixture of fuel and oxidizer in the pre-chamber is not greater than one.

19. The engine of claim 12, wherein the controller is further configured to effect a temperature of the heating element that is at least 900 K, and is below a temperature sufficient to cause auto-ignition of the lean fuel-oxidizer mixture in the main combustion chamber.

20. A method for stabilizing combustion in a lean-burn engine, the lean-burn engine including a main combustion chamber and a pre-chamber in fluid communication with the main combustion chamber, the pre-chamber having an ignition energy source and a heating element in thermal communication with the pre-chamber,
the method comprising:
providing a mixture of a fuel and an oxidizer to the pre-chamber;
producing hydrogen peroxide ($H_2O_2$) from the fuel and the oxidizer in the pre-chamber by transferring heat from the heating element to the mixture of the fuel and the oxidizer in the pre-chamber;
providing a lean fuel-oxidizer mixture to the main combustion chamber;
delivering the $H_2O_2$ produced in the pre-chamber to the main combustion chamber;
igniting the lean fuel-oxidizer mixture in the main combustion chamber by activating the ignition energy source;
producing hydroxyl radicals (OH.) from the $H_2O_2$ in the main combustion chamber in response to the igniting the lean fuel-oxidizer mixture in the main combustion chamber; and
stabilizing combustion in the main combustion chamber with the OH. radicals.

* * * * *